Patented Dec. 24, 1946

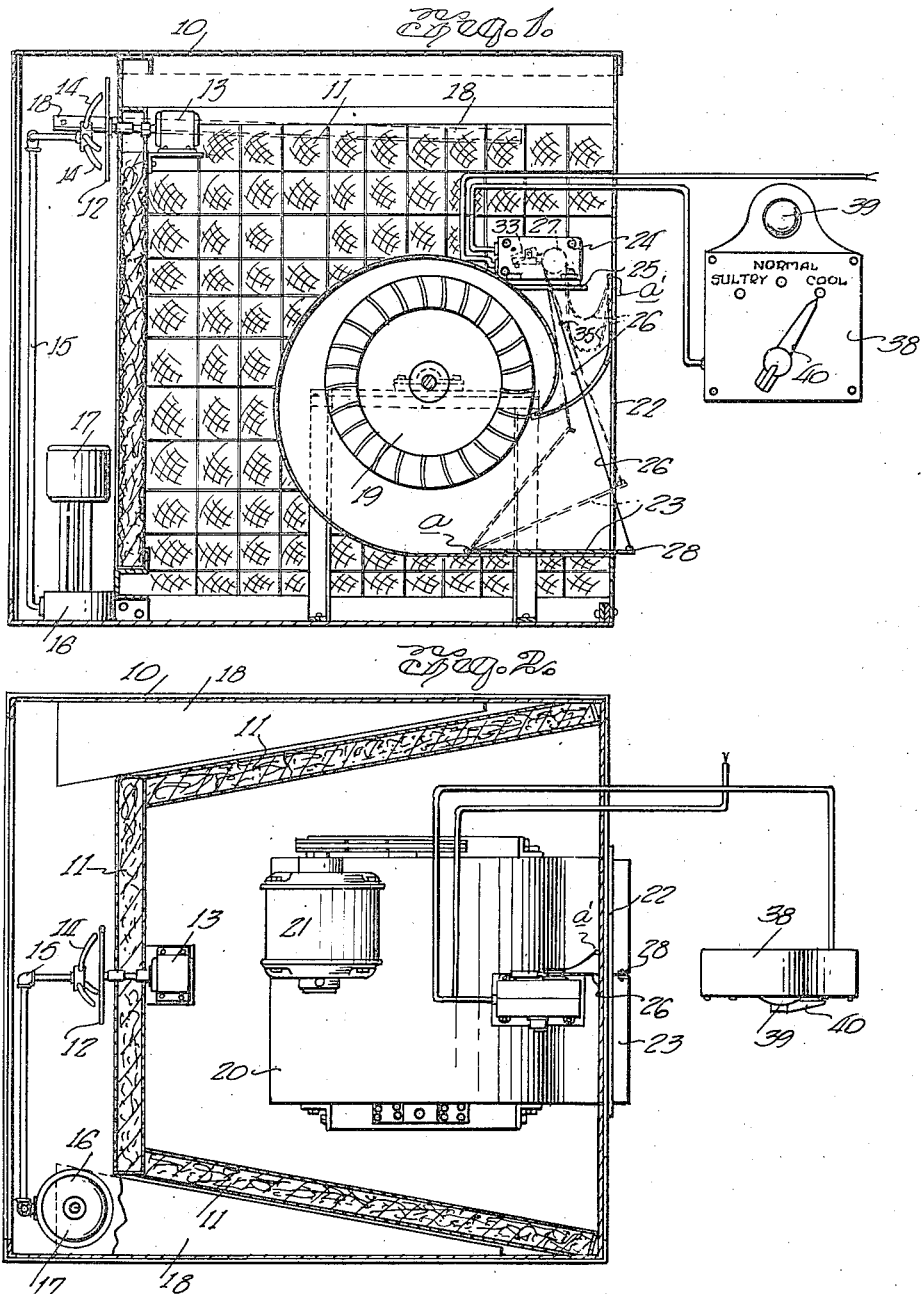

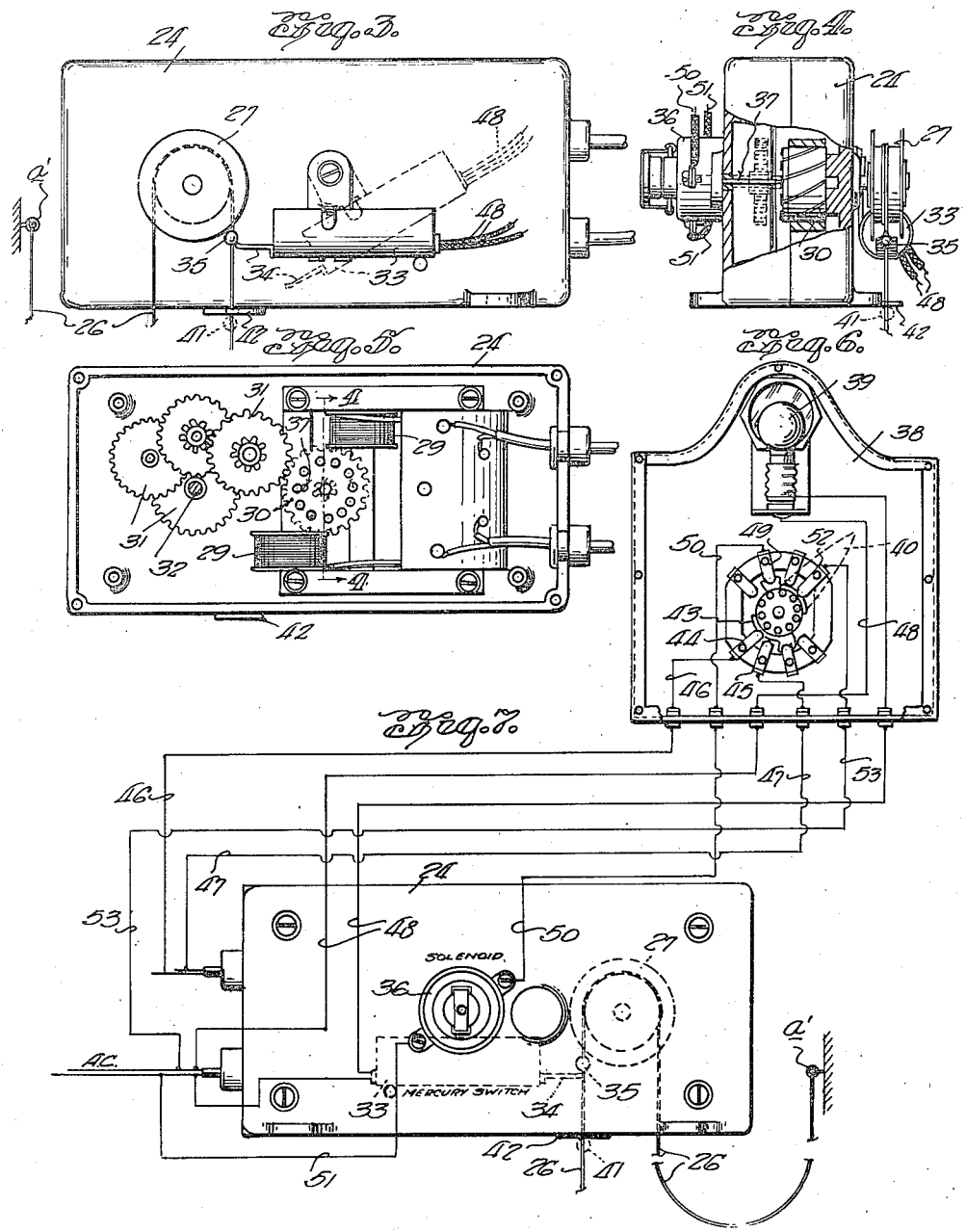

2,413,150

UNITED STATES PATENT OFFICE 2,413,150

REMOTE CONTROL FOR EVAPORATIVE COOLERS

Winn W. McReynolds, Dallas, Tex., assignor to Great National Air Conditioning Company, Dallas, Tex.

Application January 9, 1945, Serial No. 571,993

1 Claim. (Cl. 230—114)

This invention relates to evaporative cooling equipment and more particularly to a remote control system for such equipment.

The principal object of the invention is to provide electrically controlled apparatus whereby the air output of an evaporative cooler system may be predetermined in accordance with variations in weather conditions which, during certain periods of a season or in certain areas, may change frequently and radially.

As is well known, the evaporative method of air cooling can neither extract heat or moisture vapor from the air and the moisture evaporation occurring is supported by a portion of the air's sensible heat with a resultant equivalent increase in latent heat and relative humidity.

Contrasted with conventional refrigeration air conditioning, capable of providing a balanced atmosphere by predetermined setting of temperature and humidity control instruments, with air motion only that necessary to diffuse the conditioned air throughout the room, the evaporative system is compelled to provide a stronger and more perceptible air motion turbulence so that the warming effect of the higher relative humidity caused by this added latent heat of vaporization may be overcome.

Evaporative cooling systems depend entirely on moisture absorption and evaporation and naturally function excellently in areas with low wet bulb temperatures where the moisture vapor deficiency of the air is the greatest; namely, in dry, arid regions. Though less efficient, they also provide satisfactory cooling results in regions, and on days, where wet bulb temperature remains below 75°, but are the source of much dissatisfaction and complaint during the not infrequent periods when the wet bulb temperature and relative humidity range higher than normal at which times the normal operating air velocity of the system is not sufficient to offset or neutralize the warming effect of the higher humidity then prevailing.

Obviously the only solution short of mechanical or chemical dehumidification is to step up skin evaporation by providing a reserve of air volume, air velocity and air motion turbulence which will compensate for the air's higher moisture vapor content and its lessened ability to absorb additional moisture on these days.

With air motion turbulence playing such a vital part in the process of evaporative air cooling for human comfort, all such systems are forced to employ the use of a directional air distribution grille or deflector to deliver the treated air to room occupants in the so-called "breathing zone" or floor area of the room. The vanes of such grilles are usually adjusted for the normal summer operating condition, days of normal humidity, with just enough air motion permitted in "breathing zone" to offset the effects of the latent heat of vaporization occurring in the evaporation process and still not cause objectionable drafts.

Experience shows that the temperature and extent of evaporation from the skin is the main cause of the sensation of drafts and the object of the installation being comfort, care is taken to secure the required perceptible air velocity to nullify latent heat of vaporization balancing this air motion turbulence to normal day needs without a sensation of drafts.

It is at this point and because of this that the evaporative system falls short of providing comfort coolness during humid weather and by means of increased air volume, air pressure and air velocity which the improvements defined herein will accomplish, this patent inability of the evaporation air cooling system to cope with these extremes in humidity will disappear.

This invention consists of the customary evaporative medium of wetted fibrous pads, a blower constantly operating at greater than normal operating speed and powered with a motor of greater horsepower capacity than would normally be employed; a "choke-off" damper in the blower mouth to reduce air displacement of the blower to that normally required on normal, non-humid, days; the same electrically actuated by means of a damper lifting and lowering motor installed on the blower, remotely controlled from a switch adequately designating the normal and humid day operating positions.

With the foregoing objects as paramount, the invention has further reference to certain features of accomplishment which will become apparent as the description proceeds, taken in connection with the accompanying drawings wherein:

Figure 1 is a view in vertical section of an evaporative cooling unit, showing the invention, including the control panel, installed.

Figure 2 is a plan view of Figure 1 with the top of the unit removed.

Figure 3 is a side elevational view of the damper actuating motor.

Figure 4 is an end view of the motor with part of the casing broken away.

Figure 5 is a side elevational view of the motor with the side plate removed.

Figure 6 is a rear view of the control panel with the cover removed, and

Figure 7 is a schematic view of the motor with a wiring diagram showing various electrical connections thereof with the control panel in Figure 6.

Continuing with a more detailed description of the drawings, reference is primarily made to Figures 1 and 2 wherein numeral 10 denotes the cabinet of a conventional evaporative cooler, in which is disposed in the manner shown, a series of filter mats 11 of fibrous material. It is not considered necessary to enter into a detailed description of the evaporative cooling unit shown since it forms generally the subject matter of U. S. Letters Patents, Nos. 2,296,155 and 2,319,119, issued to applicant September 15, 1942, and May 11, 1943, respectively. However, for the purpose of clarifying the description to follow it is pointed out that the angular positioning of the mats 11 in the cabinet 10 has resulted in the development of the form of spray device shown which supplants the less effective jets, spray heads, troughs and the like employed conventionally for wetting the mats.

The spray device consists of a flat disc 12, rotated by a motor 13, and against the face of which is projected a plurality of streams of water by means of nozzles 14, served through a riser 15 communicating with a pump 16, the latter operated by a motor 17. The arrangement is such that water projected against the face of the rapidly revolving disc 12 will be discharged off the periphery of the disc in increased volume at two predetermined points, to be received by the extended ends of shelves or baffles 18 disposed alongside the tops of the side mats. A surplus of water precipitates downwardly, to be drawn into the rearmost mat by air suction created by the blower 19 in the housing 20, operated by a motor 21. Obviously, air constrained by the blower to enter the open rear of the cabinet and pass through the water saturated mats 11, is drawn into the intake opening of the housing 20 and discharged therefrom through the outlet opening 22.

Evaporative coolers generally are not equipped with air volume control in the mouth of the blower housing, and usually employ single speed motors for operating the blowers, hence they are incapable of meeting varying requirements caused by changes in atmospheric conditions, as expressed in the preamble hereof.

The present invention provides a motor 21 of greater horsepower than would be employed if atmospheric conditions were static. If standard two or three speed motors were employed to vary the speed of the blower to meet these conditions, the results would be unsatisfactory because the highest reduced motor speed would lower the blower speed and air displacement to an extent too low for satisfactory cooling results, even on the normal day.

To maintain a high degree of efficiency throughout all atmospheric changes, a damper 23 is hinged at $a$ to the floor of the scroll forming the periphery of the blower housing 20. The damper is thus movable to nearly close or fully open the mouth of the blower housing as well as to occupy any desired intermediate position. However, the invention concerns itself with but three positions, i. e., fully open, indicated on the control panel in Figure 1 as "Sultry"; fully closed, indicated on the panel as "Cool" and an intermediate position, indicated as "Normal."

To operate the damper 23, a small motor 24 is mounted on a suitable platform 25 immediately above the blower housing 20 and has connection with the damper 23 through a cord or flexible wire line 26, surrounding a grooved pulley 27 on the armature shaft of the motor and affixed to the forward edge of the damper 23 at a midway point 28. The opposite end of the cable is anchored at $a'$ on a stationary part of the frame of the machine.

The motor 24 is illustrated in detail in Figures 3, 4, 5 and 7 and while this motor is of conventional and well known construction, certain internal parts have been fully illustrated to more fully disclose the features of the invention. For example, the field winding 29, armature 30, and speed reduction gear train 31, through which power is supplied to rotate shaft 32 at the desired low speed and on which the pulley 27 is mounted exteriorly of the housing of the motor.

Mounted on the side of the motor housing 24 which carries the pulley 27 is a tiltable mercury switch 33, provided with an arm 34 which extends towards the cable 26 connecting the pulley 27 and damper 23. A ball 35 or an equivalent means is affixed to the cable 26 at such a point thereon that it will engage the switch arm 34 and actuate the switch 33 during a predetermined period in the operating cycle of the damper 23.

On the side of the motor housing 24, opposite the switch 33, there is mounted a solenoid 36, whose plunger pin 37 (Figs. 4 and 5) enters the motor housing 24, through an aperture provided therein and is adapted to bear upon the armature 30 of the motor to thereby serve as a brake to start and stop the same as may be necessary to predeterminately position the damper 23.

The control box or panel, by which the motor and consequently the damper 23 is controlled from a remote point, consists of the housing 38 of any desired exterior design, provided with a lamp 39 and a switch arm 40. On the front of the box 38 are inscribed the words "Cool," "Normal" and "Sultry." Since the cooling unit is invariably located in or on a building in a position not conveniently accessible, it is desirable to place the control box 38 in an office or other location for convenient operation when changes in atmospheric conditions occur, which call for a change in air out-put of the cooling unit.

It is understood that the speed of the blower motor 21 and consequently the blower 19 is constant, producing an air stream of constant volume and velocity, for the reasons stated in the foregoing. On normal, non-humid days, the air displacement of the blower 19 is reduced to normal by positioning the damper 23 at a predetermined point in the blower mouth 22, substantially the position shown in the intermediate dotted lines in Figure 1. During cool periods, the mouth of the blower is almost closed by positioning the damper as indicated by the dotted lines shown uppermost in Figure 1 while on humid days, the control arm 40 is moved to indicate "Sultry," in which position the damper is disposed at the bottom of the blower mouth or full open position.

Before entering into the description of operation, it is pointed out that the ball or trip 35 on the cable 26 which causes the mercury switch 33 to function is so positioned on the cable that it will move into engagement with the arm 34 of the switch 33 as the damper 23 arrives at the intermediate position shown in dotted lines in Figure 1, which is the "hot" day position. At this position of the damper, the signal lamp 39 will become illuminated, whereupon the control arm 40 will be again actuated to energize the solenoid 36 to cause its plunger to set the pin 37 against the armature 30 of the motor 24, stopping the same. When the damper is to be raised to closed position, a ball 41, affixed to the cable 26 at a predetermined point thereon moves against a bracket 42, extending outwardly from the motor case and which is apertured to receive the cable 26, as shown in Figures 3 and 7. Although the motor 24 continues to operate, the engagement of the ball 41 with the bracket 42 reduces tension on the cable below the bracket.

In operation and assuming that the damper 23 is in the raised position shown in dotted lines in Figure 1 and that it is desired to move the same to the intermediate position for normal or hot day operation. The control arm 40 is moved to indicate "Sultry" on the panel 38, whereupon the circuit is closed through the motor through movable contact 43 (Fig. 6) stationary contacts 44 and 45 and wires 46 and 47 respectively. As the pulley 27 revolves in a clockwise direction, viewing the same from its position in Figure 3, the cable 26 is fed therefrom under weight of the damper and as the latter moves downward, the ball or trip 35 comes into engagement with the arm 34 of the mercury switch 33, tilting the same, resulting in closing the circuit to the lamp 39 through wires 48. As soon as the light comes on, the operator turns the control arm 40 to the "normal" position, to effect engagement of the movable contact 43 with stationary contacts 52 and 49, as shown in Figure 6, to close the circuit to the solenoid 36 through wires 50 and 51. The plunger pin 37 of the solenoid will be thrust into engagement with the armature 30 of the motor (Fig. 4) stopping the same.

Should it be desired to further lower the damper 23 to full open or "sultry" position, it is simply necessary to move the control arm 40 to indicate "sultry" on panel 38. Circuit will be closed to the motor through movable contact 43, contacts 44, 45 and wires 46 and 47, respectively. When the damper reaches the fully lowered position shown in Figure 1, the motor may continue to operate but it will have no effect.

To move the damper to an intermediate or full open position, the control arm 40 is moved to indicate "Cool" on the panel 38, whereupon the motor is reversed and the circuit is opened, the motor being a constant potential motor and will reverse itself. When the fully closed position of the damper is reached, the ball 41 on cable 26 engages the bracket 42, thereby suspending further effects of the motor, although the latter will continue to be energized.

It is apparent from the foregoing that full control of air produced by the evaporative cooling unit may be had at all times and from a point remotely situated therefrom. Moreover, by virtue of the reserve speed of the constant speed motor employed to operate the blower 19, air volume and velocity is at all times adequate to meet any conditions and may be reduced at will to correspond to any variations in atmospheric conditions by simple manipulation of the control arm 40, without affecting the motor 21.

Manifestly, the construction as shown and described is capable of some modification and such modification as may be construed to fall within the scope and meaning of the appended claim is also considered to be within the spirit and intent of the invention.

What is claimed is:

An air volume control for air evaporative coolers including in combination with the blower and blower casing of said cooler, a damper movable to vary the discharge area of said casing, means for automatically operating said damper, said means comprising a motor having cable connection with said damper, a solenoid, a plunger actuated by said solenoid and engageable with the armature of said motor to stop the same at predetermined positions of said damper and means for remotely controlling said damper operating means to predetermine the position of said damper in relation to the discharge opening of said casing.

WINN W. McREYNOLDS.